March 30, 1926.
K. H. KINGDON
ELECTRON DISCHARGE DEVICE
Filed July 1, 1921
1,579,117
2 Sheets-Sheet 1
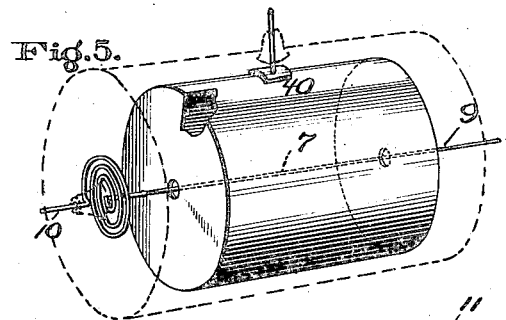
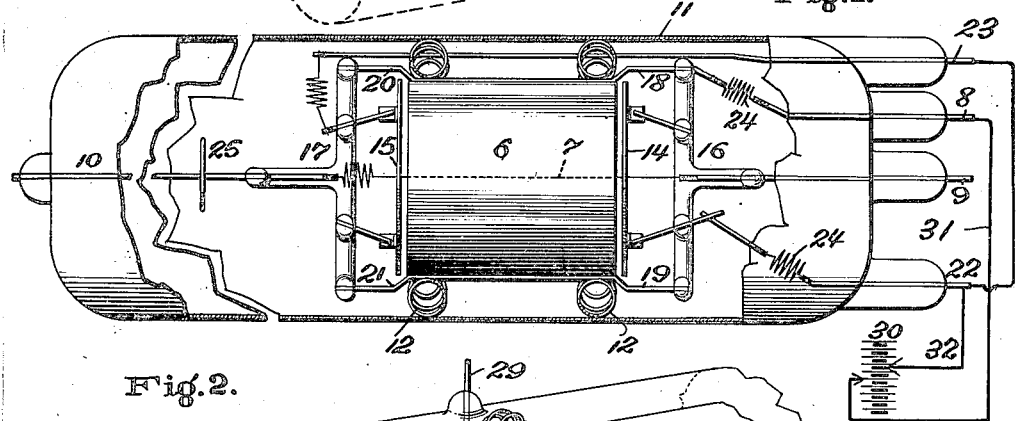
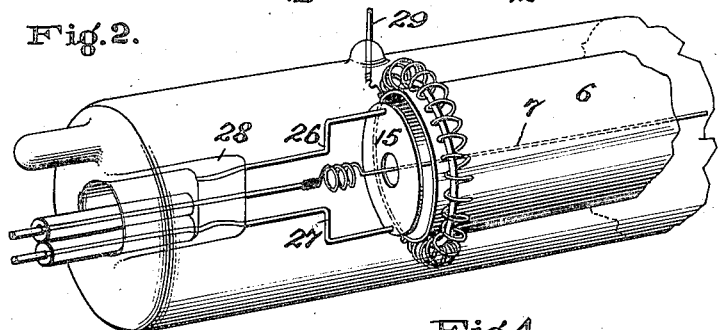
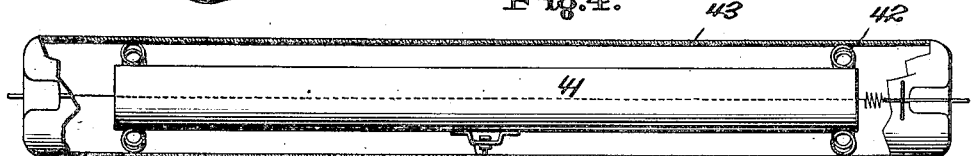
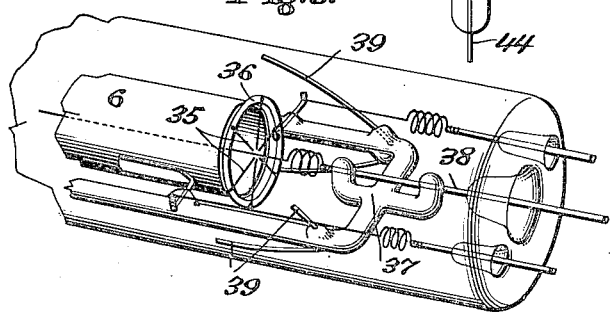
Inventor:
Kenneth H. Kingdon,
by *Albert G. Davis*
His Attorney.

March 30, 1926.  1,579,117
K. H. KINGDON
ELECTRON DISCHARGE DEVICE
Filed July 1, 1921  2 Sheets-Sheet 2
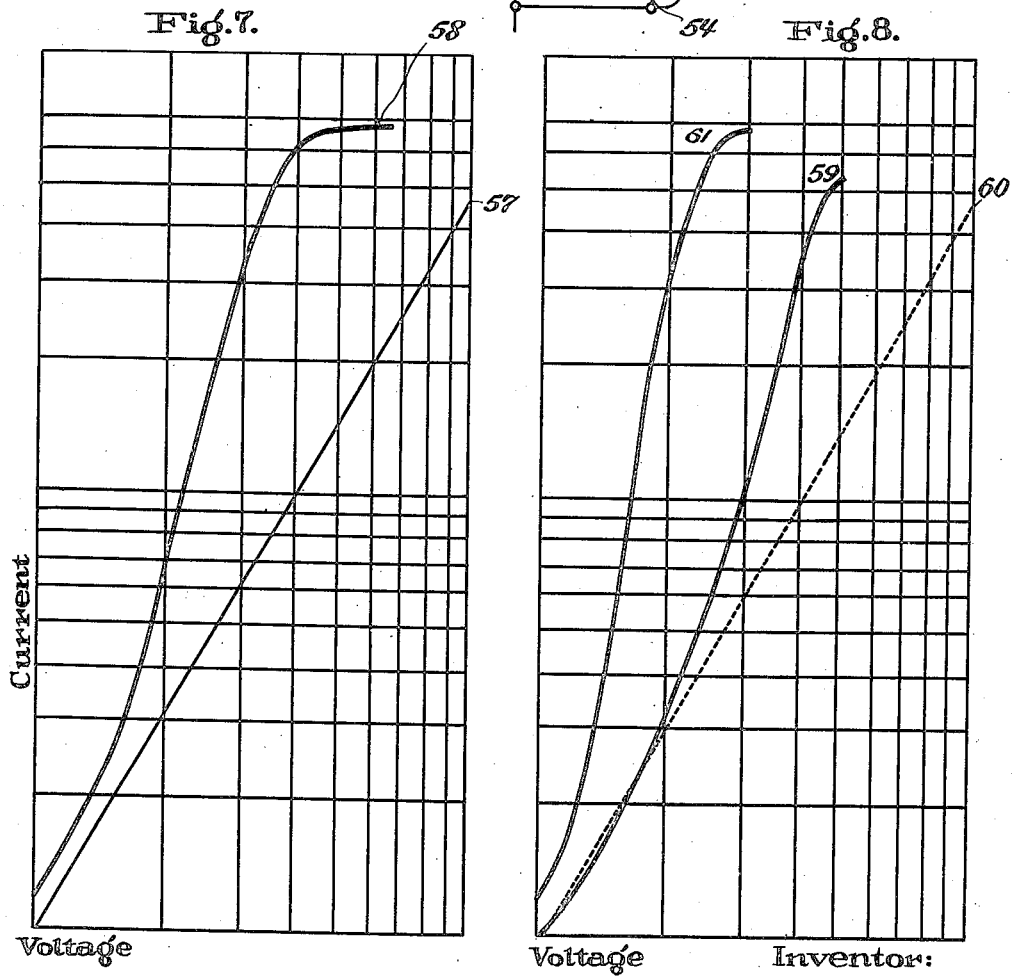
Inventor:
Kenneth H. Kingdon
by Alvin G. Davis
His Attorney, Patented Mar. 30, 1926.

1,579,117

UNITED STATES PATENT OFFICE.

KENNETH H. KINGDON, OF SCHENECTADY, NEW YORK, ASSIGNOR TO GENERAL ELECTRIC COMPANY, A CORPORATION OF NEW YORK.

ELECTRON-DISCHARGE DEVICE.

Application filed July 1, 1921. Serial No. 481,975.

*To all whom it may concern:*

Be it known that I, KENNETH H. KINGDON, a subject of the King of Great Britain, residing at Schenectady, county of Schenectady, State of New York, have invented certain new and useful Improvements in Electron-Discharge Devices, of which the following is a specification.

The present invention comprises a new electron discharge device having fundamentally new electrical characteristics.

Devices in which current is transmitted across space by electrons emitted by the cathode without appreciable gas ionization have now become well known. Devices operating by this principle of pure electron conduction are in commercial use; for example, the kenotron, a two electrode device, is used principally for rectifying alternating currents, and the pliotron, a three electrode device, is used principally for radio purposes, both for sending and receiving. Dr. Irving Langmuir, who is a pioneer in this field of pure electron discharges, has analyzed and described the electrical characteristics of pure electron discharge devices in a series of articles, among which are the following: Physical Review, December, 1913, Physikalische Zeitschrift, vol. 15, pp. 348 and 516, and Proceedings of the Institute of Radio Engineers, vol. 3, p. 261. In these articles Dr. Langmuir has demonstrated that the conduction of electron current from the cathode to the anode is limited by the mutual repulsive effect of the electrons, and has named this limitation to current flow, the space charge effect. In other words, the negative electric field of each electron in the space between cathode and anode acts to retard the passage of all of its companion electrons. Some positive ionization inevitably always occurs, but in a device exhibiting space charge characteristics, the positive ions for various reasons discussed by Dr. Langmuir in his papers, have little or no effect. Due to this inhibiting effect of space charge, the transmitted current is less than it would be if there were present in the space enough positive ions to materially neutralize the negative electric field of the electrons. When the number of positive ions produced by gas ionization is negligible, the current, I, rises with a rise of impressed voltage, V, in a regular manner which under ideal conditions may be expressed by the equation: $I = aV^{3/2}$, $a$ being a constant depending on structural features which need not now be considered. If greater currents are desired for any reason than those conditioned by this law, gas may be admitted to the device. However, the ionization of gas in an electronic device will affect its electrical characteristics otherwise than by increasing the current; for example, an increase of ionization causes electrical disintegration of the cathode, limits the rectifying action of the device, and produces irregularities in operation. In these prior devices the positive ions were dissipated by striking negatively charged members in the tube, as for example, the walls of the tube or the cathode.

In accordance with my present invention, which includes both a new method and a new apparatus, currents materially greater than those conditioned by the space charge law are transmitted without the undesirable effects of gas ionization. This result is accomplished by accumulating positive ions in the electrode space where their presence neutralizes the negative space charge of the electrons and thus increases materially the current-carrying capacity of the device (referring to the currents carried by the device over a certain voltage range) without producing deleterious effects of ionization.

Should an ion start from rest near the anode, and move toward the cathode under the influence of the electric field between cathode and anode, it will discharge upon the cathode. The atoms of a gas from which the ions are formed, however, are never at rest due to the thermal agitation and the majority of the ions, therefore, will have a motion transverse to the radius. This motion if large enough, will make it impossible for the ions to strike the cathode and the ion might execute orbits to and fro across the tube, but usually escapes through the open ends of the anode.

In devices embodying my invention the anode, for example, may surround the cathode, and a construction is chosen to prevent the escape of positive ions which execute orbits about the cathode so that by their accumulation the current-carrying capacity is increased without the necessity of increasing the rate of ion formation by admitting more gas, which would produce undesired effects.

The accumulation of the positive ions is carried out by several methods and means constituting different features of my invention. Among these are the following: First, the positive ions are prevented from escaping from the region between the electrodes by the geometrical relation or shape of the electrodes or by the provision of guard members, as will be later explained; second, the likelihood of the positive ions striking the cathode and becoming discharged is reduced, for example, by making the internal diameter of an enclosing cylindrical anode relatively large with respect to the external diameter of a filamentary cathode, and thirdly, giving the ions a velocity transverse to a radial direction, for example, by a relatively high temperature of the gas, that is large thermal velocities of the residual gas molecules. The ions formed as a result of collision of electrons and such gas molecules will approach the cathode with a component of transverse motion which will prevent the ions striking the cathode.

The accompanying drawings illustrate several embodiments of my invention. Fig. 1 is a side elevation, partly in section, of one form of electron tube provided with charged guards whereby positive ions are trapped; Figs. 2 and 3 are perspective views of modifications; Fig. 4 is a side view of a tube constructed to carry out my invention without the use of means structurally distinct from the anode and cathode for accumulating positive charges in the space between the electrodes; Fig. 5 illustrates in perspective the electrodes of still another form of device embodying my invention in which the anode and a guard for preventing the escape of positive ions are consolidated into a single structure; Fig. 6 is a diagram of connections, and Figs. 7 and 8 are curves illustrating the electrical characteristics of devices embodying my invention.

Referring to the drawing, the device shown in Fig. 1 comprises a cylindrical anode 6 and a filamentary cathode 7 axially located within the anode 6. An anode leading-in conductor 8 and cathode conductors 9, 10 are sealed into an envelope 11 consisting of glass or other suitable material. The anode conveniently is supported by helically coiled wires 12 sprung between the anode and the container 11. Closely adjacent the ends of the cylindrical anode 6 are conductive plates 14, 15 mounted upon insulating supports 16, 17, which in turn are carried by wires 18, 19 and 20, 21 attached to the anode. The plates 14, 15, as shown in Fig. 1, are provided with apertures through which the cathode conductors pass. Conductors 22, 23 sealed into envelope 11 are connected respectively to the plates 14, 15. Light helical springs 24 may be inserted in circuit with the various conductors as indicated to improve the mechanical properties of the construction. A spiral spring 25 (shown on edge) is included in the cathode connection 10.

In Fig. 2 a slightly modified construction has been illustrated, the guard ring 15 being carried by supports 26, 27 imbedded in the stem 28. The opposite end of the tube has not been shown, the construction being similar. In the tube illustrated by Fig. 2, the anode conductor 29 is sealed into the side of the tube and current connection to the ring 15 is made by the conductor 27.

Externally my new device may be provided with suitable means for charging the guard rings to desired potentials with respect to the anode. For purpose of illustration a battery 30 has been indicated, to which connection is made by conductors 31, 32 respectively from the anode 6 and the rings 14 and 15. The terminals have been shown as movable so that any desired potential may be impressed between the anode and the guard rings.

In the modification shown in Fig. 3, projecting conductors or feelers 35 are mounted upon a ring 36 adjacent the anode end and project close to the cathode without actually touching the cathode. The anode in this modification is supported upon a two pronged support 37 of glass mounted upon the cathode conductor 38. If desired, stiff wires 39 sealed at one end into the support 37 and at the opposite end touching the container wall may be provided to assist in holding the electrode structure in desired position.

In Fig. 5 the guard rings have been consolidated by welding or otherwise with the anode thereby producing a cylindrical anode 40 with nearly closed ends. The cathode conductors 9, 10 project through holes in the ends of the anode as indicated. The enclosing container is indicated by dotted lines.

In fact, when the anode is long relative to its diameter, as shown in Fig. 4, the end plates may be entirely omitted. The anode 41 shown in this figure has a length twelve times its diameter. The ends of the anode are supported by spirals 42 sprung against the envelope 43. The anode conductor 44 is sealed into a side tube 45.

Whatever the structural features of devices embodying my invention may be, they are preferably first thoroughly deprived of occluded gases and evacuated to a pressure so low that the effect of positive ionization would be inappreciable unless provision were made for the accumulation of positive charges. In most cases the envelope is sealed off when the residual gas pressure therein is so low that the effect of gas ionization in reducing space charge is rendered evident only when the anode guards are charged to trap positive ions. In other cases, a suitable gas may be admitted after the devices have been evacuated, for example, a small quantity of argon, helium, nitrogen, hydrogen, or mercury vapor. The gas pressure should not be so high that an arc-like discharge will occur, and ordinarily should be of the same order of magnitude as in the pure electron discharge devices described in the above publication by Dr. Langmuir, usually a pressure below one-tenth of a micron.

My invention is also applicable to devices in which ionization of admitted gas in the space traversed by the electron current will neutralize the space charge effect to some extent, thereby increasing the current above the theoretical value obtainable under the same conditions without ionization effects. A still greater increase of current-carrying capacity is obtained by trapping positive ions in accordance with my invention as will be explained hereinafter with reference to Fig. 8.

Fig. 6 indicates one system of connections suitable for devices embodying my invention. The cathode 7 is connected to the secondary of a transformer 50. The anode 6 is connected to a conductor 51 which may carry direct or alternating current, the return conductor 52 being connected to the middle point of the secondary winding of the transformer 50. The guard rings 14, 15 may be connected to the anode in circuit with an external source of potential, such as the battery 30. By moving the contacts 53, 54 relative to each other, the potential of the battery may be caused to oppose or assist the anode potential. If desired, the switch 55 may be moved into contact with the conductor 56, thereby removing the battery from circuit and connecting the plates 14, 15, directly to the anode. Ordinarily the plates 14, 15 are operated at the same potential as the anode.

The effect of the trapping of positive ions is illustrated by the logarithmic curves in Figs. 7 and 8. The crossed lines are spaced apart distances corresponding to the logarithms of the current and voltage values. The values of curent and voltage are plotted directly, the ordinates corresponding to currents and the abscissæ to voltages. Referring to Fig. 7, the curve 57 represents the relation of current and voltage when the guard plates 14, 15 are connected to the negative end of the cathode filament 7, and thus are rendered ineffective for trapping the positive ions. This curve 57 is a straight line, indicating that the current varies as a regular function of the voltage but it is not a theoretical three-halves power curve on account of the disturbing effect of the structural features not concerned with the present invention, as for example, the voltage drop in the cathode, and the electrostatic effect of the guard plates.

When the guard plates 14, 15 are connected to the anode the increase of current with rise of voltage occurs at a very materially faster rate which in the specific case here illustrated is represented by a curve 58. It will be observed that for a certain voltage range, the increase of current by reason of the guard plates is five to six fold. The pressure in the device having the characteristics illustrated by curve 58 had a residual gas pressure of mercury vapor of about 0.002 microns (.000,002 m. m. of mercury). The lower parts of the curves 57 and 58 do not coincide due to the grid-like electrostatic screening action of the guard plates when negatively charged with respect to the anode, as was the case for curve 57.

Fig. 8 illustrates the characteristics under different conditions of the same device when the residual gas pressure is materially higher, namely, 0.026 microns. The curve 59 shows the relation of current and voltage values when the guard plates were connected to the negative end of the filament. This curve is materially steeper than the curve 60 (shown in dotted lines) which would be expected were the residual gas pressure low enough to render positive ionization negligible. In other words, in this case positive ionization has reduced space charge above the ionization voltage range and has produced a substantial increase of current. When the end guard plates are connected to the anode the effect of the ionization of the residual gas is increased still more as indicated by the curve 61.

What I claim as new and desire to secure by Letters Patent of the United States, is,—

1. A device comprising an evacuated container, an electron-emitting cathode and an anode geometrically so shaped and so related to said cathode that positive ions produced in the space between said electrodes are accumulated in said space thereby causing a current between said electrode to vary with variations of applied voltage at a materially higher rate than would be characteristic of said device in the absence of an accumulation of positive ions in the discharge space between said electrodes.

2. A device comprising an electron-emitting cathode, an anode and an enclosing envelope, the parts of said tube and the space therein being so highly evacuated that said device has the characteristics of a pure electron discharge with the exception of current-carrying capacity, the electrodes being geometrically so related that the effect of space charge is materially neutralized by an accumulation of positive charge during the operation of said device.

3. A device comprising an evacuated container, an electron-emitting cathode having a linear extension, an anode surrounding said cathode, the geometrical relations of said electrodes being adapted to materially increase the current-carrying capacity by accumulating a positive charge in the space between said electrodes, residual gases being so attenuated that positive gas ionization otherwise has no appreciable effect on the electrical characteristics of said device.

4. A device comprising an evacuated container, a cathode comprising a substantially linear filament of refractory metal, an anode spaced symmetrically about said cathode, the geometrical relations of said electrodes being chosen to materially neutralize space charge by decreasing the rate of dissipation of positive ions, the residual gas pressure being so low that the electrical characteristics of said device are regular and reproducible and the cathode remains substantially intact from electrical disintegration during operation.

5. An electron discharge device comprising an electron-emitting cathode, an anode and a sealed enclosing envelope, the parts of said tube and the space therein being deprived of gas to such degree that deleterious effects of gas ionization are absent, the parts of said device being geometrically so related as to accumulate a positive charge in the space between said electrodes whereby the current-carrying capacity below saturation is increased.

6. An electron discharge device comprising a sealed envelope, electron-emitting cathode, a cylindrical anode enclosing said cathode, and means for preventing the escape of positive ions from the space within said cylinder.

7. An electron discharge device comprising a sealed envelope, an electron-emitting cathode, a cylindrical anode symmetrically located about said cathode, conductors at least in part extending between said cathode and anode at the ends of said anode, and means for maintaining said conductors positively charged.

8. An electron discharge device comprising an evacuated container, a cylindrical anode located therein, a filamentary cathode located axially within said cylinder, a conductive guard or guards located at the mouth or mouths of said cylinder, and connections for maintaining said guard or guards positively charged.

9. The method of increasing the current-carrying capacity of an electron discharge device in which the residual gas pressure is low enough to limit the flow of current by the mutual repulsion of the electrons which consists in screening the walls of the envelope of said device from the space surrounding the cathode by a positive electrostatic field thereby accumulating positive ions in the path of the current in said device.

10. The method of increasing the current-carrying capacity of an electron discharge device in which the residual pressure is so low that energy flow is restricted by the negative electric field of the current-carrying electrons which consists in decreasing the rate of dissipation of positive ions in the path of a discharge through said device.

11. An electrical discharge device comprising an evacuated container, a linear filamentary electron-emitting cathode, a cylindrical anode enclosing said cathode and having an internal diameter which is so large with relation to the external diameter of said cathode that discharge of positive ions upon the cathode is negligible, and means for preventing the escape of positive ions from the space between said anode and cathode.

12. An electron discharge device comprising a cathode adapted to emit electrons, an anode geometrically so related to said cathode that positive ions between said electrodes will accumulate and an enclosing envelope, the space therein being evacuated to a pressure as low as two thousandths of a micron of mercury.

In witness whereof, I have hereunto set my hand this 30th day of June, 1921.

KENNETH H. KINGDON.